(12) United States Patent
Kredo

(10) Patent No.: US 6,714,637 B1
(45) Date of Patent: Mar. 30, 2004

(54) CUSTOMER PROGRAMMABLE CALLER ID ALERTING INDICATOR

(75) Inventor: Thomas J. Kredo, Rochester, NY (US)

(73) Assignee: Nortel Networks Limited, Quebec (CA)

(*) Notice: Subject to any disclaimer, the term of this patent is extended or adjusted under 35 U.S.C. 154(b) by 0 days.

(21) Appl. No.: 09/421,024

(22) Filed: Oct. 19, 1999

(51) Int. Cl.[7] .................................................. H04M 3/42
(52) U.S. Cl. ............................ 379/215.01; 379/88.19; 379/142.08
(58) Field of Search .......................... 379/88.12, 88.16, 379/88.19, 88.2, 88.21, 88.22, 88.23, 142.01, 142.08, 373.02, 374.02, 215.01

(56) References Cited

U.S. PATENT DOCUMENTS

| | | | |
|---|---|---|---|
| 4,873,719 A | * 10/1989 | Reese | 379/215 |
| 5,289,530 A | * 2/1994 | Reese | 379/88 |
| 5,309,512 A | 5/1994 | Blackmon et al. | |
| 5,526,406 A | 6/1996 | Luneau | |
| 5,533,102 A | 7/1996 | Robinson et al. | |
| 5,550,908 A | 8/1996 | Cai et al. | |
| 5,619,561 A | * 4/1997 | Reese | 379/142 |
| 5,636,269 A | * 6/1997 | Eisdorfer | 348/14.01 |
| 5,651,054 A | * 7/1997 | Dunn et al. | 39/88.11 |
| 5,805,587 A | 9/1998 | Norris et al. | |
| 5,805,677 A | 9/1998 | Ferry et al. | |
| 5,809,128 A | 9/1998 | McMullin | |
| 5,825,867 A | 10/1998 | Epler et al. | |
| 5,828,742 A | 10/1998 | Khalid et al. | |
| 5,832,060 A | * 11/1998 | Cortlett et al. | 379/88 |
| 5,836,009 A | 11/1998 | Diamond et al. | |
| 5,946,381 A | * 8/1999 | Danne et al. | 379/142.07 |
| 5,999,613 A | * 12/1999 | Nabkel et al. | 379/142.04 |
| 6,028,922 A | * 2/2000 | Deutsch et al. | 379/211 |
| 6,078,581 A | * 6/2000 | Shtivelman et al. | 370/352 |
| 6,104,800 A | * 8/2000 | Benson | 379/215.01 |
| 6,219,414 B1 | * 4/2001 | Maciejewski et al. | 379/215 |
| 6,253,075 B1 | * 6/2001 | Beghtol et al. | 455/415 |
| 6,269,159 B1 | * 7/2001 | Cannon et al. | 379/202.01 |
| 6,308,221 B1 | * 10/2001 | Perlman et al. | 370/238 |
| 6,317,488 B1 | * 11/2001 | DePond et al. | 379/93.35 |
| 6,339,639 B1 | * 1/2002 | Henderson | 379/142.08 |
| 6,343,121 B1 | * 1/2002 | Infosino | 379/215.01 |
| 6,347,136 B1 | * 2/2002 | Horan | 379/142.01 |
| 6,389,124 B1 | * 5/2002 | Schnarel et al. | 379/142.01 |
| 6,393,106 B1 | * 5/2002 | Cannon et al. | 379/142.08 |
| 6,404,858 B1 | * 6/2002 | Farris et al. | 379/201.02 |
| 6,445,694 B1 | * 9/2002 | Swartz | 370/352 |
| 2001/0043691 A1 | * 11/2001 | Bull et al. | 379/142.08 |

FOREIGN PATENT DOCUMENTS

| | | | | |
|---|---|---|---|---|
| JP | 0048749 | * | 5/1981 | 379/215 |
| JP | 0250256 | * | 10/1988 | 379/215 |
| JP | 0250257 | * | 10/1988 | 379/215 |
| JP | 0022162 | * | 1/1989 | 379/215 |
| JP | 0060137 | * | 3/1989 | 379/68 |
| JP | 0137859 | * | 5/1989 | 379/68 |
| JP | 0232862 | * | 9/1989 | 379/68 |
| JP | 0248747 | * | 10/1989 | 379/215 |
| JP | 0253389 | * | 10/1989 | 379/215 |
| JP | 0256358 | * | 10/1990 | 379/215 |
| SU | 0474115 | * | 6/1975 | 379/215 |

* cited by examiner

*Primary Examiner*—Scott L. Weaver
(74) *Attorney, Agent, or Firm*—Hunton & Williams LLP

(57) ABSTRACT

An audio alerting announcement signals a subscriber 80 during an ongoing call with a distinctive tone to indicate the identity of another party who is trying to call the subscriber. A telephony call-waiting subscriber customizes Call Waiting indicators in order to give immediate recognition of caller or caller classification via audio signaling. The caller or caller classification is based on the calling party's Line Number ID. This capability is not restricted to the public switched telephone network (PSTN) environment, but will function equally well in a voice-over-IP telephony network as well, on a network such as the World Wide Web, or will function in a hybrid system containing elements of both PSTN and voice-over-IP networks.

19 Claims, 3 Drawing Sheets

CUSTOMER PROGRAMMABLE CALLER ID ALERTING INDICATOR

BACKGROUND OF INVENTION

The invention relates generally to telecommunications services, and more specifically to the provision of caller identification information to a called telecommunications service subscriber at a time when the called subscriber is already occupied with a prior call; this type of service is generally termed Caller ID Call Waiting.

1. Definitions

'Line' refers either to a telephone line, to a Web address, or to any other type of communication channel which provides for voice connection to a subscriber in control of such a line, address or channel.

'Phone number' refers to an identifying text of character codes used to specify uniquely a line as defined above. The choice of character codes to be used is in part dependent on restrictions required for the type of communication channel to which the line belongs; in the Public Switched Telephone Network (PSTN), only numbers or their dialing equivalents in telephone number format are allowable, while on the World Wide Web, any string of displayable characters which can be mapped to an Internet communication channel is usable.

2. Discussion of Prior Art

Several prior art references address the signaling of a called party with information about the calling party, but fail to combine signaling features in the unique range of contexts and manners performed in the proposed invention.

U.S. Pat. No. 5,636,269 to Eisdorfer describes collecting information about the caller, such as the caller's identity or the importance of the call, and provides a distinctive call waiting signal which may take the form of an audio announcement. Eisdorfer does not, however, provide for any application of the art in a voice-over-IP network, nor does it explicitly spell out the use of a database to map caller identification to a desired course of action, nor does it provide for cut-through of real-time one-way signaling directly from the caller.

U.S. Pat. No. 5,828,742 to Khalid et al. creates a passcode-based distinction among callers, manifested only through distinctive ringing. It offers no voice-based customization of called party notifications.

U.S. Pat. No. 5,809,128 to McMullin notifies an on-line computer user of the presence of an incoming telephone call, links the computer to the incoming call over the Internet, and provides for completion of the call using the computer's Internet connection. McMullin does not, however, provide for one-way cut-through of real-time signaling directly from the caller as a substitute for the ring signal.

U.S. Pat. No. 5,526,406 to Luneau provides for presentation of calling party announcement to the called party, but makes no provision for such presentation in a Call Waiting scenario.

U.S. Pat. No. 5,836,009 to Diamond et al. describes a method of signal attenuation during Call Waiting signaling, but offers no customization of the Call Waiting signaling itself.

U.S. Pat. No. 5,825,867 to Epler et al. describes methods of signaling during Call Waiting, but fails to address its operation on the World Wide Web.

SUMMARY OF INVENTION

An audio alerting announcement signals a called party during another ongoing call. The invention allows a telephony call-waiting subscriber to customize Call Waiting indicators in order to give immediate recognition of caller or caller classification via audio signaling. The caller or caller classification is based on the calling party's Line Number ID. This capability is not restricted to the public switched telephone network (PSTN) environment, but will function equally well in a voice-over-IP telephony network as well, on a network such as the World Wide Web, or will function in a-hybrid system containing elements of both PSTN and voice-over-IP networks.

DETAILED DESCRIPTION OF INVENTION

Figure 1:
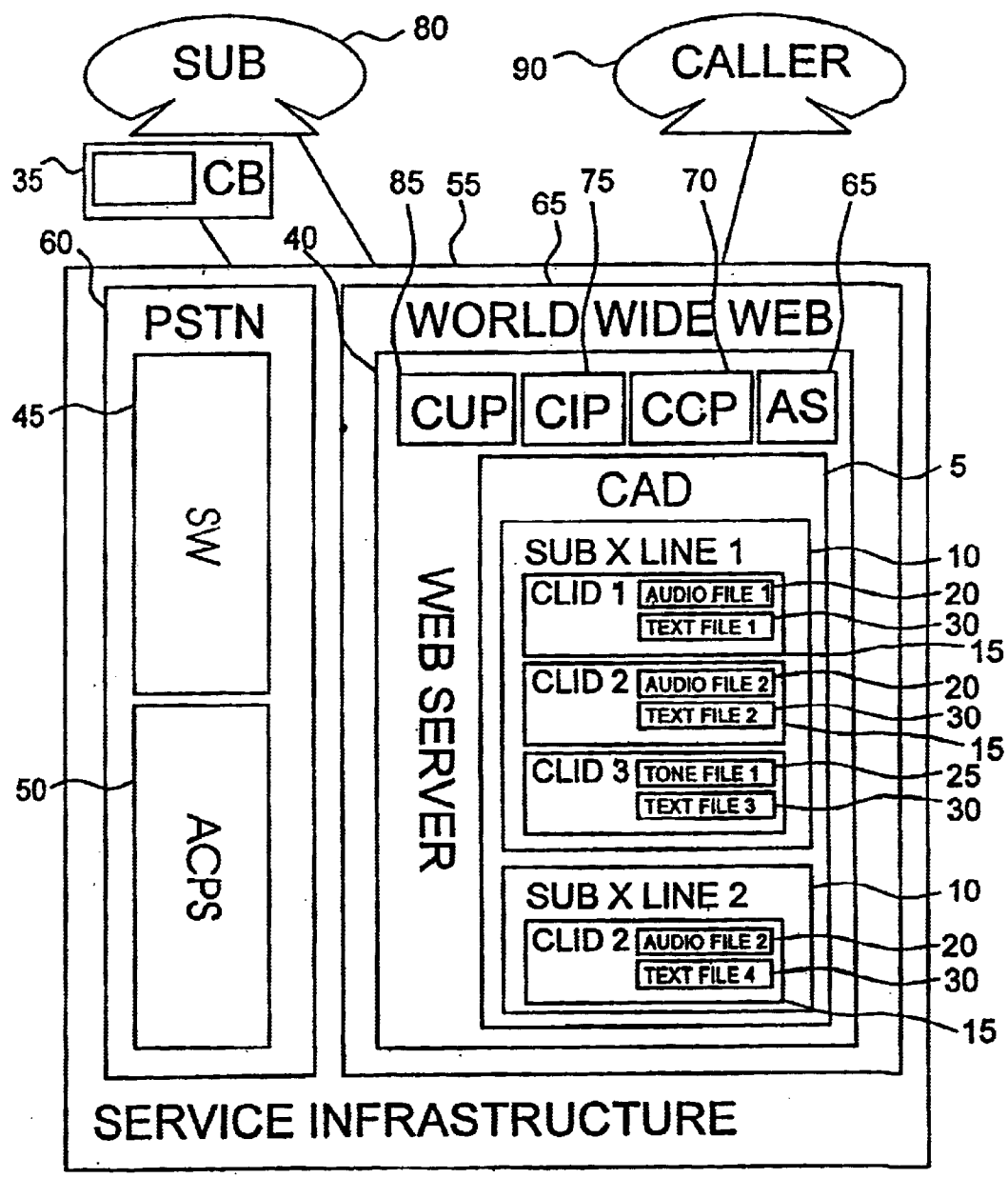
FIG. 1 shows an overview of all components of the invention, including some detail in the Caller Alert Database.

Refer to FIG. 1. A subscriber 80 is connected to a caller 90 by a service infrastructure 55 that includes in any operable combination a public switched telephone network (PSTN) 60, a switch 45 and its internal computing subsystems, a computer system 50 adjunct to a switch 45 (adjunct call processing system, ACPS), and an Internet and World Wide Web 100. Each switch is controlled by an Automatic Call Processing System (ACPS) 50. Calls from the caller 90 to the subscriber may occur over only the PSTN 60 or over the WWW 100 or over a combination of both using Voice over Internet Protocol.

On the WWW 100 there is a web server 40 that includes a computer program that provides a customer with Customer Programmable Caller ID Alerting Indicator or CIAI. The CIAI includes a Customer Alert Database 5 with supporting access software. For each subscribed line 10 of each CIAI subscriber 80 the database 5 includes a list of Calling Line ID phone numbers 15, each with associated audio files 20 or tones 25, and corresponding text 30 for display to CIAI subscriber 80 on a caller ID box 35 or other text display device associated with line 10 of CIAI subscriber 80. Customer Alert Database 5 is shown on a Web server 40, but may also reside on a telephony switch 45 with its internal computing subsystems, or on a database computer system 50 adjunct with a Web server 40 or a switch 45.

The web server 40 includes a resident call control processing software program 70. However, software program 70 may reside in either a telephone switching system itself 45 or in a call-processing system 50 adjunct to switch 45. Program 70 conducts the call-control coordination necessary to activate Caller ID Program 75, plays selected audio files and tones 20, 25 and displays selected text files 30 to Caller ID Box 35 for use by subscriber 80.

Caller ID software program 75 is also resident in web server 40. However, software program 70 may reside in either a telephone switching system 45 or in a call-processing system 50 adjunct to switch 45. Program 75 looks up a phone number or line identifier 10 in customer alert database 5, selects corresponding audio and text files 20, 25, 30 and feeds audio and text files 20, 25, 30 to call control program 70.

Customer Update software program 85 is resident in web server 40. However, software program 70 may reside in either a telephone switching system 45 or in a call-processing system 50 adjunct to switch 45. Program 85 conducts a dialog with any subscriber 80 allowing subscriber 80 to access database 5 to initiate, terminate or modify the use of any CLID information 15 for any subscribed line 10 for subscriber 80, including the recording, alteration or deleting of any audio and/or text files 20, 25, 30 stored in caller information record 15 for subscriber line 10.

Figure 3:
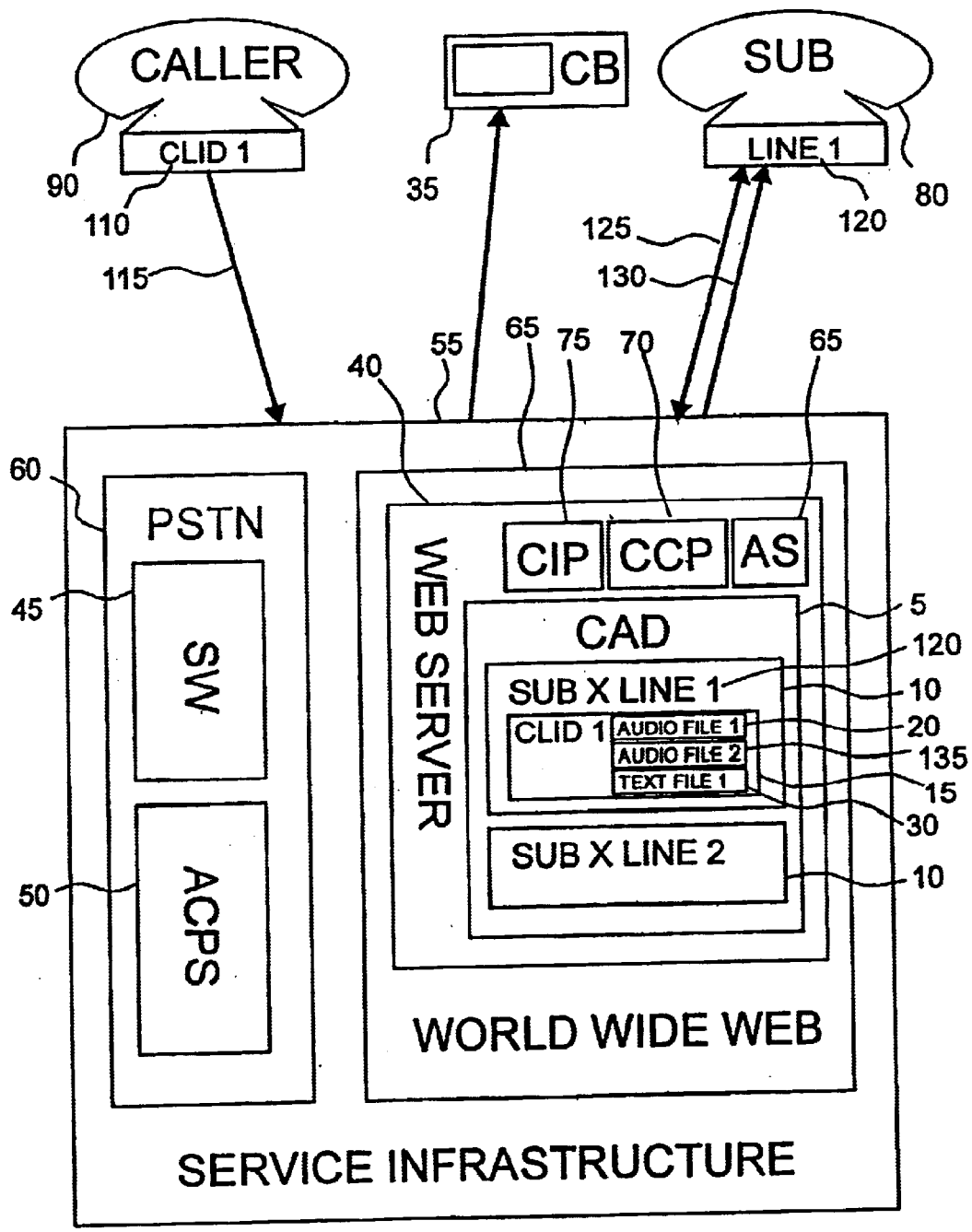
FIG. 3 shows an overview of the process of handling a call requiring use of caller alert processing as specified in the invention.

Audio subsystem 65 is invoked by call control program 70 and plays a tone or audio file 20, 25 on a communication line for a subscriber. Refer to FIG. 3; audio subsystem 65 may also play an audio file 135 for a caller 90.

OPERATION OF INVENTION

Figure 2:
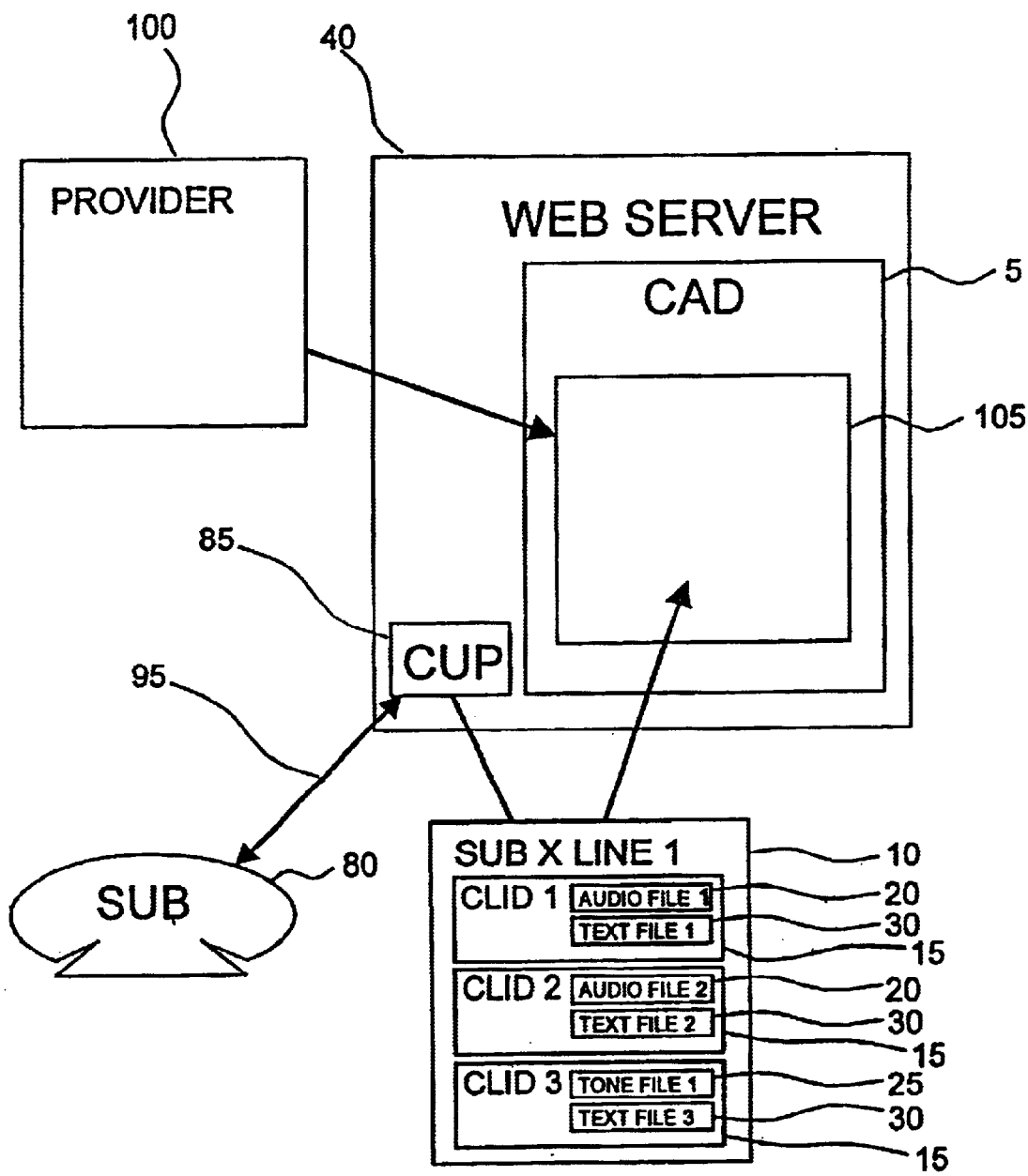
FIG. 2 shows an overview of the process of establishment and maintenance of subscriber Caller Alert Database information, as specified in the invention.

Refer to FIG. 2. A provider 100 of service of the invention first establishes in Web server 40 in Caller Alert Database 5 for each subscribed line 10 of subscriber 80 a set of storage resources 105 sufficient to store and use a list of Calling Line ID phone numbers 15 each with associated audio files 20 or tones 25, and corresponding text 30 for display to CIAI subscriber 80 on a caller ID box or other text display device associated with one or more of lines 10 belonging to CIAI subscriber 80.

Before any call to a line 10 for a subscriber 80 can be processed using features of this invention, subscriber 80 initiates a dialog with Customer Update Program 85 to store in Caller Alert Database 5 a list of calling line ID phone numbers 15. For each calling line phone number 15, subscriber 80 creates and stores an associated set of audio files 20 or tones 25, and corresponding text 30 for display when caller identification is to be provided during another ongoing call. Dialog 95 between subscriber 80 and customer update program 85 may take place via a CGI or other World Wide Web interface, via an audio dialog over the phone itself, or by any other means consistent with the forms and content of data to be stored and presented.

Subscriber 80 may initiate dialog with Customer Update Program 85 at any time to initiate, terminate or modify information stored for subscriber 80 in Caller Alert Database 5.

Refer to FIG. 3. In the normal operation of the invention, a caller 90, with phone number or identifier 110 attempts a call 115 to a phone number or identifier 120 for a subscriber 80 who uses the invention and who is at time of call 115 engaged with a prior call 125 on line 120. Service infrastructure 55 detects busy status of line 120 and passes identities of caller line 110 and called line 120 to call control program 70.

Call control program 70 determines that subscriber 80 is engaged in call 125 on line 120, and activates caller ID program 75.

Caller ID program 75 accesses database 5 to retrieve for subscriber 80 any calling line information containing any entry 15 for line 110 belonging to caller 90.

If database 5 contains no calling line ID information 15 for subscriber line 120, caller ID program 75 returns a notification to call control program 70 that no special treatment of caller 90 is prescribed. Call control program 70 initiates return of a standard busy notification to caller 90 via service infrastructure 55, and exits.

If subscriber 80 has calling line information in database 5, and subscriber line 120 is listed for subscriber 80, caller ID program 75 retrieves Calling Line ID phone number data 10 for line 120. If caller line identifier 110 is listed under subscriber line 120 in database 5, caller ID program 75 retrieves for display and playback any audio files 20, 135 or tones 25 and corresponding text files 30 associated with caller line identifier 110 under subscriber line 120. Caller ID program 75 passes audio files 20 and 135 or tones 25 and corresponding text 30 for line 120 to call control program 70.

Call control program 70 uses any appropriate method well-known in the art to add to call 125 an audio feed 130 which is audible only to subscriber 80 on call 125 on line 120. Call control program 70 plays audio files 20 for line 120 over feed 130 into call 125 on line 120, mixing feed 130 input so that it is audible only to subscriber 80, with ongoing call 125 audio signals using line 120. During playing of audio files 20, service infrastructure 55 or call control program 70 returns ringing signal or audio file announcement 135 to caller 90 by means well-known in the art.

If text 30 for line 120 for calling line 110 is returned to call control program 70, call control program 70 transmits text 30 to a caller ID box 35 or other text display device associated with CIAI subscriber's line 120, given the availability of such a display device.

Following presentation of caller ID information to subscriber 80 by call control program 70, call handling proceeds by means commonly understood in the art. Subscriber 80 may choose to interrupt call 125 and take call 115, or else continue call 125 and defer response to call 115.

ALTERNATE EMBODIMENTS OF THE INVENTION

Refer to FIG. 3 and FIG. 2. I an embodiment using PSTN technology, the invention is implemented completely within PSTN 60 except for Customer Update Program 85, Caller Alert Database 5, and access to Customer Update Program 85, Caller Alert Database 5 by a subscriber 80 to the invention's services. In this embodiment, service infrastructure 55, within PSTN 60 components such as switch 45 and adjunct call processing system 50, manages all aspects of call control including access to Caller Alert Database 5 over a link between infrastructure 55 and a Web server 40. Web server 40 contains Caller Alert Database 5 and Customer Update Program 85, and provides update access to Caller Alert Database 5 and Customer Update Program 85 from subscriber 80.

In this embodiment, the terms 'line' and 'phone number' have their traditional meanings as understood in PSTN telephony.

In an alternative embodiment using World Wide Web and voice-over-IP technology, the invention is implemented completely within the World Wide Web and the Internet. In this embodiment, the term 'line' means a logical path of voice access over a subscriber's Internet connection, and the term 'phone number' means an identifying name or label for such a path of access. Also, in this embodiment, the text associated with a calling line identifier appears on the subscriber's Web display rather than on a separate device.

In another alternative embodiment using streaming audio and video technology, the invention implements the storage and playback of combined audio, video and virtual-reality files to accomplish its signaling both to the subscriber and to the calling party, as connection bandwidths and display capabilities permit. Such files are edited and stored in the Customer Alert Database by the subscriber in the same manner as for other types of files or data.

In still another alternative embodiment using audio interaction scripting, the invention allows the caller to interact with the call control program to select from among alternatives such as hanging up, leaving a voice message, leaving a text message or waiting for connection. Scripts for such programmed interactions are edited and stored in the Customer Alert Database by the subscriber in the same manner as for other types of files or data.

ILLUSTRATIVE EXAMPLE

Sam Townson, a lone businessman working from his home office, subscribes to the invention (Caller ID Alert Indicator, or CIAI) as provided by one of his local telecommunications exchange carriers. He uses his computer, browser and Internet connection to visit the carrier's CIAI website, where he uses interactive forms to set up his list of numbers for which he wants special treatment when CIAI is invoked. He includes in the list the number for his primary-care physician, Dr. Angela Parker; for her, he records a special audio message to announce her name to him whenever she calls: "This incoming call is from Dr. Parker's office. The call is awaiting attention." (sub x, line 1, CL1 D2). He adds a special acknowledgment message to be played for the caller at the same time: "Mr. Townson is being signaled, and should be with you shortly. Please remain on the line; he considers your call to be important." (sub x, line 2, CL1 D2).

Later, Sam is engaged in a call with his business partner Norman via his Web-based telephone connected through his workstation to his ISP's Web server. At this time Dr. Parker calls him with results of blood tests from his physical examination three days earlier. Dr. Parker is using a regular phone on the PSTN; she dials an ordinary telephone number for Sam.

Dr. Parker's call reaches an Internet gateway, where the dialed number is converted to an Internet address for Sam. The connection process from this point to Sam's Web server as for any PSTN-to-voice-over-IP call.

Dr. Parker's call, with its calling line number attached, arrives at the Web server handling Sam's Internet and telephone services and access. The Web server maintains information indicating that Sam is currently engaged in another call. The Web server finds Sam's list of calling line IDs in its database, locates Dr. Parker's line number in Sam's list, and retrieves audio files and text information from Dr. Parker's line number entry, along with a priority code for Dr. Parker that specifies playing audio files on any active call.

The Web server notifies Sam of the incoming call by playing Dr. Parker's audio file on Sam's side of the ongoing call. The Web server also presents Dr. Parker's text file in a window on the screen of Sam's workstation. Concurrently, the Web server feeds back to Dr. Parker the acknowledgment message Sam had recorded for Dr. Parker's office to hear.

While hearing the audio file being played by the server over his conversation on the prior call, Sam reads the text file's contents, and decides to take the call from Dr. Parker. He excuses himself from the first call, and signals the server to connect him directly.

The call between Sam Townson and Dr. Parker then continues normally.

CONCLUSION, RAMIFICATIONS, AND SCOPE OF INVENTION

From the foregoing detailed description, alternate embodiments and illustrative example, the convenience, simplicity and flexibility of the invention and its use should be apparent. Specifics of signaling, messaging and administration are relegated to commonly-accepted methods, combined with innovation so as to ease the burden of effort, and extend the possible set of call responses, for the subscriber to the invention's services.

The invention does not depend explicitly and fully on a specific substrate technology, PSTN or Web, for the handling of calls; instead, it offers a service that bridges the differences between these technologies, thereby- avoiding restrictive constraints that would otherwise limit its usefulness to both its subscribers and its providers. This freedom from such restrictions renders the invention more attractive, both personally and commercially, than many similar proposals previously developed.

Although the description, operation and illustrative material above contain many details, these details should not be construed as limiting the scope of the invention but as merely providing illustrations and examples of some of the preferred embodiments of this invention.

Thus the scope of the invention should be determined by the appended claims and their legal equivalents, rather than by the examples given above.

I claim:

1. A method for identifying a calling party to a subscriber to a call service, the method comprising the steps of:

storing one or more calling party identifiers for a subscriber to a call service, each of the one or more calling party identifiers identifying a respective calling party of interest to the subscriber;

receiving a first calling party identifier identifying a first calling party attempting to call the subscriber while the subscriber is connected to a third party;

matching the received calling party identifier with one of the one or more stored calling party identifiers;

providing an indicator as to the identity of the first calling party to the subscriber while the subscriber is still connected to the third party; and providing a stored acknowledgement unique to the first calling party while the subscriber is still connected to the third party.

2. The method of claim 1, further comprising the step of:

storing one or more unique indicators as to the identity of the first calling party along with the first calling party identifier.

3. The method of claim 2, wherein the step of providing an indicator includes providing at least one of the one or more stored unique indicators as to the identity of the first calling party to the subscriber while the subscriber is still connected to the third party.

4. The method of claim 3, wherein at least one of the one or more stored unique indicators is an audio indicator.

5. The method of claim 3, wherein at least one of the one or more stored unique indicators is a visual indicator.

6. The method of claim 1, further comprising the step of:

storing an acknowledgement unique to the first calling party along with the first calling party identifier.

7. The method of claim 1, wherein the stored acknowledgement is an audio acknowledgment.

8. The method of claim 1, wherein the one or more calling party identifiers are stored on one or more Web servers.

9. The method of claim 1, wherein the subscriber is identified by a subscriber identifier, further comprising the step of:

storing the subscriber identifier along with the one or more calling party identifiers.

10. The method of claim 9, further comprising the step of:

receiving the subscriber identifier along with the first calling party identifier.

11. The method of claim 10, further comprising the step of:

matching the received subscriber identifier with the stored subscriber identifier so as to verify that the subscriber is a subscriber to the call service.

12. The method of claim 9, wherein the subscriber identifier is stored along with the one or more calling party identifiers on one or more Web servers.

13. The method of claim 1, further comprising the step of:

allowing the subscriber to add, delete, or modify a stored calling party identifier identifying a respective calling party of interest to the subscriber.

14. A computer signal embodied in a carrier wave readable by a computing system and encoding a computer program of instructions for executing a computer process for performing the method recited in claim 1.

15. A system for identifying a calling party to a subscriber to a call service, the system comprising:

at least one storage unit for storing one or more calling party identifiers for a subscriber to a call service, each of the one or more calling party identifiers identifying a respective calling party of interest to the subscriber; and at least one processing unit for:

receiving a first calling party identifier identifying a first calling party attempting to contact the subscriber while the subscriber is connected to a third party;

matching the received calling party identifier with one of the one or more stored calling party identifiers;

providing an indicator as to the identity of the first calling party to the subscriber while the subscriber is still connected to the third party; and providing a stored acknowledgement unique to the first calling party while the subscriber is still connected to the third party.

16. The system of claim 15, wherein the at least one storage unit comprises at least one Web server.

17. An article of manufacture for identifying a calling party to a subscriber to a call service, the article of manufacture comprising:

at least one processor readable carrier; and instructions carried on the at least one carrier;

wherein the instructions are configured to be readable from the at least one carrier by at least one processor and thereby cause the at least one processor to operate so as to:

store one or more calling party identifiers for a subscriber to a call service, each of the one or more calling party identifiers identifying a respective calling party of interest to the subscriber;

receive a first calling party identifier identifying a first calling party attempting to contact the subscriber while the subscriber is connected to a third party;

match the received calling party identifier with one of the one or more stored calling party identifiers;

provide an indicator as to the identity of the first calling party to the subscriber while the subscriber is still connected to the third party; and provide a stored acknowledgement unique to the first calling party while the subscriber is still connected to the third party.

18. The article of manufacture of claim 17, wherein the one or more calling party identifiers are stored on one or more Web servers.

19. The system of claim 15, further comprising:

at least one storage unit for storing the acknowledgement unique to the first calling party.

* * * * *